No. 887,151. PATENTED MAY 12, 1908.
C. THURWANGER.
SYSTEM OF INSTRUCTION IN THE PRONUNCIATION OF FOREIGN WORDS IN VOCAL MUSIC.
APPLICATION FILED JUNE 12, 1903.

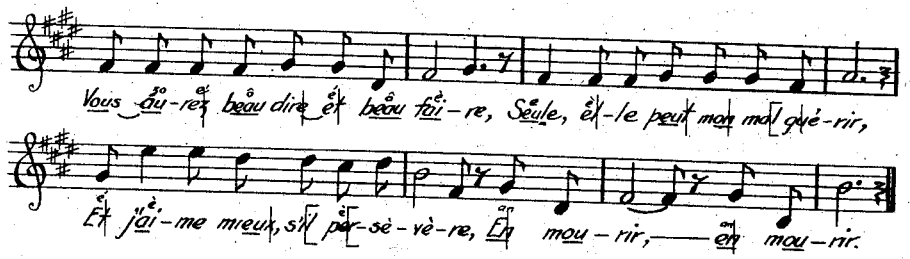

Fig. 4.

1ST. The sign ⌣ indicates the joining of a letter belonging to a word to the vowel begining the following word.

2ND. A cross lined letter (e̸t̸) is not pronounced.

3RD. The sign [ indicates that the letter, or letters isolated,—in singing—must be articulated with the following syllable.

4TH. A Consonant is underlined to indicate that it must be especially articulated.

Attest:
C. D. Mitchell
P. V. Nining by Camille Thurwanger Inventor:
Frothingham & Wentworth,
his Attys.

UNITED STATES PATENT OFFICE.

CAMILLE THURWANGER, OF BOSTON, MASSACHUSETTS.

SYSTEM OF INSTRUCTION IN THE PRONUNCIATION OF FOREIGN WORDS IN VOCAL MUSIC.

No. 887,151.     Specification of Letters Patent.     Patented May 12, 1908.

Application filed June 12, 1903. Serial No. 161,245.

*To all whom it may concern:*

Be it known that I, CAMILLE THURWANGER, a citizen of the Republic of France, residing at Boston, in the county of Suffolk and State of Massachusetts, have invented certain new and useful Improvements in Systems of Instruction in the Pronunciation of Foreign Words in Vocal Music, of which the following is a specification.

The invention relates to what may properly be called a phono-illustrative system of instruction to aid those persons who do not speak a foreign language fluently in their efforts to acquire the exact, proper pronunciation of words in the said foreign language.

It is not intended to produce a system of self instruction which will dispense with the services of teachers, but to aid both teachers and pupils by presenting selections in a manner which will enable them to recognize at sight, the proper pronunciation of the words in the original language or recall such after a lapse of time, and thus overcome or minimize the difficulties arising from a common inability to thoroughly master a foreign language and particularly the proper pronunciation and division of individual words, or words associated together in a manner to affect the pronunciation of one or all.

I will explain my system for the benefit of an English speaking person who desires to pronounce for example the words of a French song correctly.

There are only fifteen vowel sounds in French, which are represented by certain model signs or letters. But in seventy times out of one hundred, the sounds are represented by signs of other sounds, for example; the vowel "e" sounds like "e" in "her", but in "ferme", in "des, les, mes, tresse", it has the sound of "è" or its equivalent in English, "e" in "hen". Again a combination of vowels like "ai" for instance, has sometimes the sound of one model vowel, and sometimes that of another, for example: "ai" is pronounced like "y" in "city" ("é" in French) as "aimer"; like "e" in "hen" ("è" in French): "j'aime;" like "e" in "her" ("e" in French); "je faisais." There are quantities of similar combinations which present the same difficulties. This is the real great difficulty for those English speaking people who do not speak the French language very fluently, because they never know exactly when to pronounce one way or the other.

The object and purpose of my system is to remove all such difficulties, and it consists in annotating a song in a foreign language, by placing, either by writing or printing, adjacent to irregularly pronounced letters in songs, for example, the correct pronunciation by means of model vowels and other signs which are explained preferably on a page opposite to that of the words of the song by what is termed a "key" to the said system.

To illustrate my system and for the purpose of indicating what I consider my invention to be, I have shown in the accompanying drawings a portion of a song written in French including the score and the libretto, a key illustrating the vowel marks, a key illustrating the consonant mark and an additional explanation of the special characters, or symbols employed.

In said drawings, Figure 1 is an illustration of a part of a song with the libretto in French, showing the manner of associating the words and the notes and the various signs and symbols employed in carrying out the invention; Fig. 2 is a part of a chart or key illustrating the vowel and diphthong markings and exemplifying the meaning of the same; Fig. 3 is a part of a chart illustrating the consonant markings and exemplifying the meaning of the same, and Fig. 4 is a part of a chart illustrating various special signs and symbols whereby various letters are indicated as silent, as being pronounced in a special manner with relation to adjoining words or syllables or as being emphasized.

*Model vowels.*

| French vowels. | Equivalent in English. |
|---|---|
| â | As "a" in father, bar. |
| a | " " " cat, fat. |
| o | " "o" " or, for. |
| ô | " " " nose, rose. |
| i-y | " "ea" " eat, deal. |
| u | Has no exact equivalent but can be easily pronounced by placing the mouth as to whistle and pronouncing e. It is almost the sound of whistling itself. |
| é | As "y" in city, very. |
| è | " "e" " hen, "ai" in painful. |
| e | " "e" " her. |

*Compound vowels.*

| | |
|---|---|
| ou | As "oo" in food, poor, too. |
| eu | Has no exact equivalent, something like "ea" in earnest, but pronounced with the lips more forward. |

*Nasal vowels.*

| | |
|---|---|
| an | As "an" in wander, aunt. |
| on | " "on" " long, don't. |
| in | " "an" " thanks. |
| un | " "un" " trunk, lung. |

The four nasal vowels are only â, ô, i, u, made nasal; the N (or M, which would be the same) is merely there as a sign to indicate that the vowel is to be nasal, but must not be pronounced at all.

Single N or M between two vowels, and double N or M (NN, MM) are never nasal.

*Consonants.* b, d, f, k, l, m, n, p, r, s, t, v, x,—are articulated as in English. C and g are hard before a, o, u, like in "cat, go" etc., and soft before é, è, e, i, y, like in "certain" and like s in pleasure.

J—always soft as s in pleasure.

ch—like "sh" in shoe. (Sometimes ch is like k).

qu—always like k.

w—always like v.

s—between two vowels or carried over from the end of a word to the vowel beginning the next word, like S in rose; ex.; bons⌣amis pronounce bon zami.

gn—like "ng" in morning, evening etc., ex. "digne."

ll, or l,—at the end of a word are sometimes liquid, but not in singing, a slight articulation of one l is articulated in the middle of the kind of diphthong formed by the liquid sound, ex. "fille" should be pronounced: fi-li-e,—just enough to give the singer a slight articulation for his sound, not enough to be heard by the listener. Each time that the liquid l comes in a word, the exact pronunciation is marked above.

h—can be considered as always silent.

t—is sometimes, but rarely, articulated like C,—it will be marked.

z—as S in rose or z in zone.

*Signs.*

N. B.—When vowels in words of songs are not pronounced as in the above list of model sounds, the equivalent to the sound needed as per list of model sounds, will be printed above the doubtful syllable. Reference to the key will indicate the exact sound.

[ This sign inclosing a consonant indicates that the inclosed consonant must be as much as possible articulated with the following syllable, ex: ju[s-ti-ce, détou[r-ne,— which is here divided according to grammatical rules, but which should be sung as if it was ju-sti-ce, de-tou-rne.

| This sign between a vowel and a consonant like: de-tre|s-se, means the following consonant belongs phonetically to the next syllable.

Letters barred like: et̶, h̶âte, etc., are not to be articulated at all.

— Underlined consonant has to be articulated: soupi̲r, bref̲, bel̲, etc.

⌣ This sign is used to indicate that a consonant at the end of a word must be articulated with a following vowel, ex: cet⌣ami, mon⌣âme.

In the application of the invention as heretofore described, a song is published in the foreign language in the usual manner in so far as the division of the several words into syllables and the association of each syllable and word with the proper musical note according to the relation of the pronunciation of each word or syllable with the musical note is concerned. These syllables or words are then annotated as described in a manner to indicate the proper pronunciation or phonetics of irregularly pronounced letters or combinations of letters in each word and syllable according to the requirements of vocal music and of the several words and syllables in relation to each other and to the musical notes; and also those consonants which are mute. The embodiment of my system comprises, therefore, a sight construction of the phonetics of the entire selection, respecting the various words as correlated and the selection so annotated will preserve in its entirety all the typographical as well as the orthographical characteristics of the foreign language.

It is apparent that my system may be readily applied to the German, the Italian, the English or in fact any foreign language to instruct or aid vocalists of any other nativity to acquire the proper pronunciation of words in the original language.

What I claim as new and desire to have protected by Letters Patent is:

In a system of instruction in the pronunciation of foreign words in vocal music, the musical score and the associated words in a foreign language of a vocal production printed or written with the words divided into syllables according to the foreign language, and associated with the musical notes according to the pronunciation of the words or syllables relative thereto, various signs and symbols respectively dividing the several words and syllables according to their phonetic division in relation to each other, to adjoining words or syllables, and to the musical notes, and indicating mute and articulated letters or groups of letters, and model vowels or other characters placed adjacent to vowels or combinations of letters indicating their pronunciation with relation to their association with adjoining words or syllables and to the tones indicated by the musical notes, and an accompanying key explaining said signs and symbols and said model vowels or other characters.

In witness whereof, I have hereunto affixed my signature this eighth day of June, 1903, in the presence of two witnesses.

CAMILLE THURWANGER.

Witnesses:
N. L. FROTHINGHAM,
A. A. ASHMAN.